Oct. 15, 1957    H. OSBORN ET AL    2,809,832
SHEET DETECTORS FOR PRINTING, CUTTING, CREASING AND LIKE MACHINES
Filed May 31, 1955    7 Sheets-Sheet 1
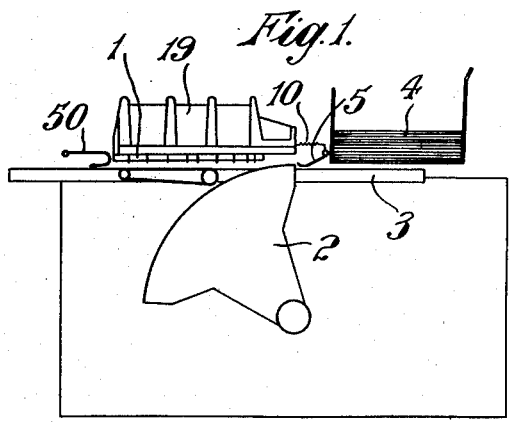
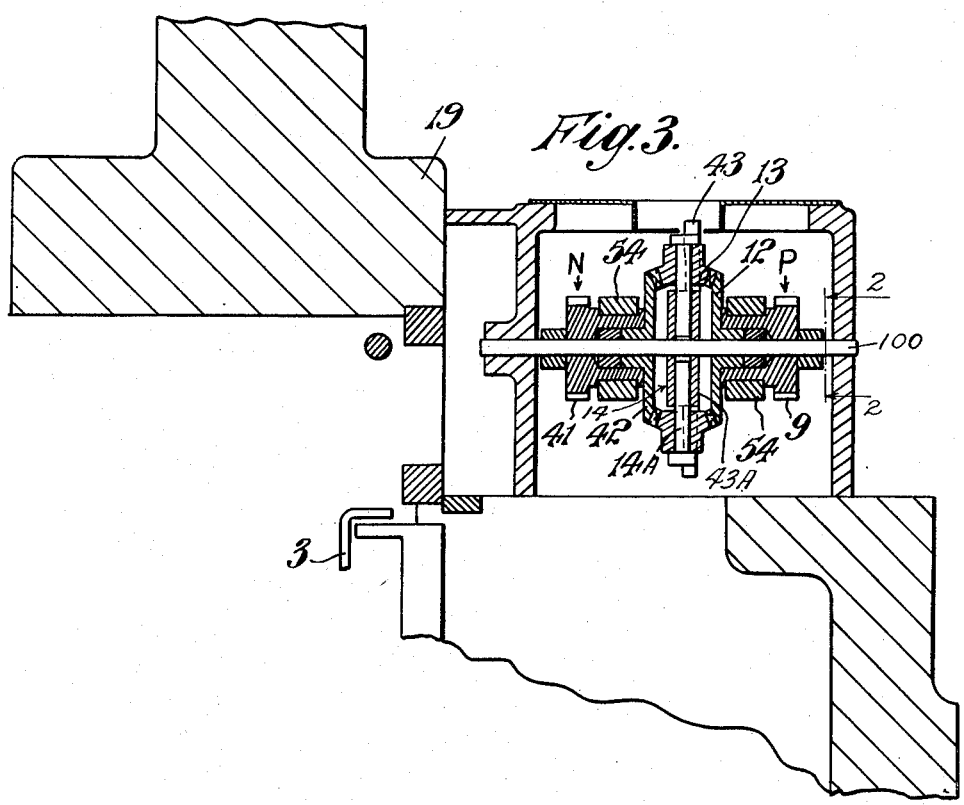
INVENTORS
Tom Rowlands & Howard Osborn
By Watson, Cole, Grindle & Watson
ATTORNEYS

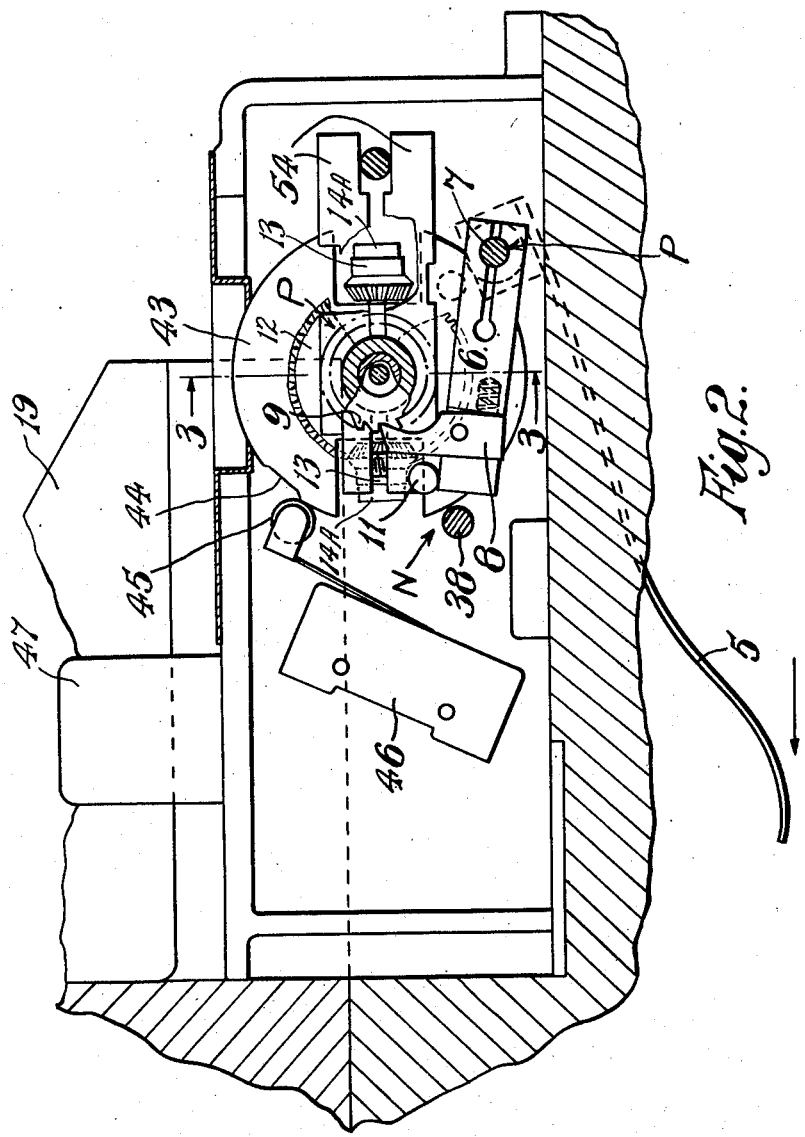

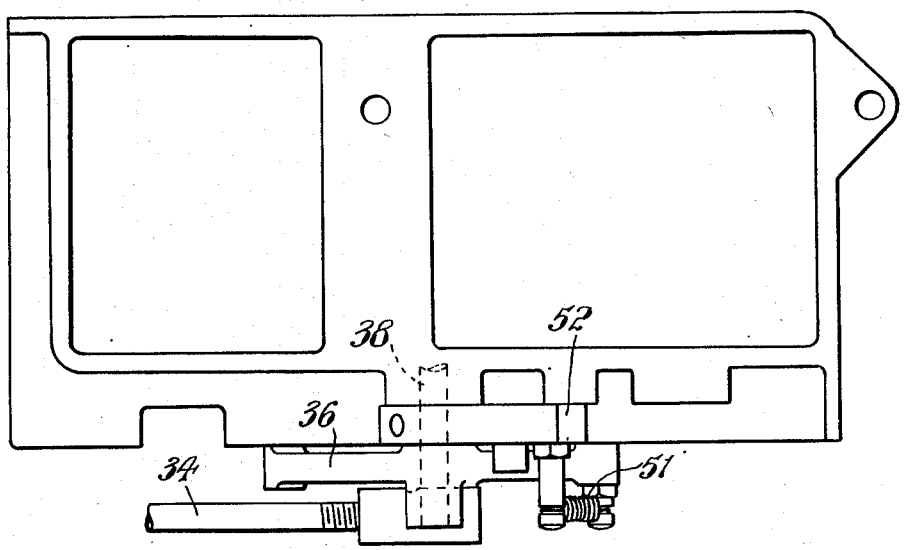
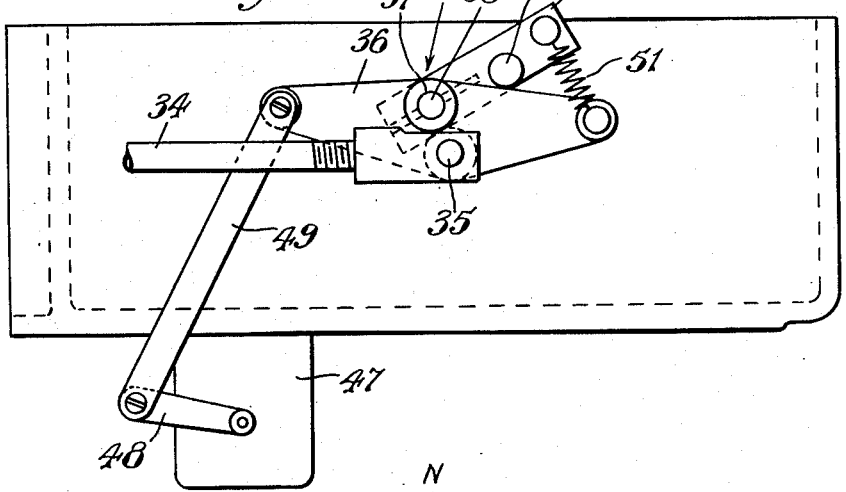
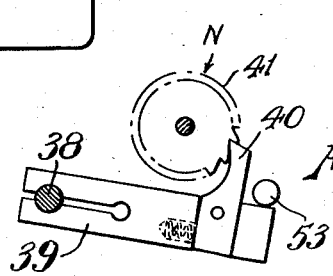

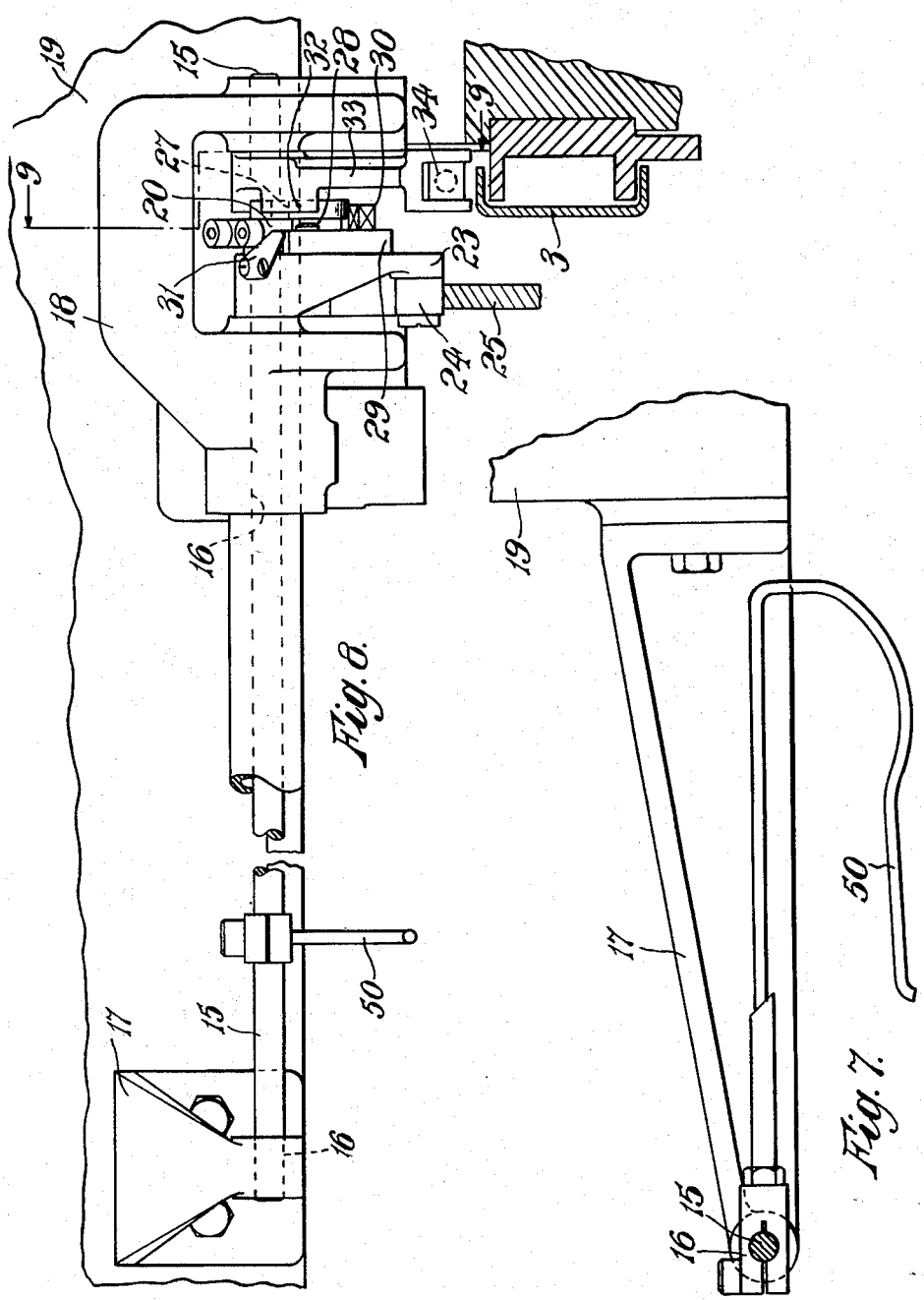

Oct. 15, 1957     H. OSBORN ET AL     2,809,832
SHEET DETECTORS FOR PRINTING, CUTTING, CREASING AND LIKE MACHINES
Filed May 31, 1955     7 Sheets-Sheet 5

INVENTORS
Tom Rowlands & Howard Osborn
By Watson, Cole, Grindle & Watson
ATTORNEYS INVENTORS
TOM ROWLANDS & HOWARD OSBORN
BY Watson, Cole, Grindle & Watson
ATTORNEYS ையார
United States Patent Office 2,809,832
Patented Oct. 15, 1957

2,809,832

SHEET DETECTORS FOR PRINTING, CUTTING, CREASING AND LIKE MACHINES

Howard Osborn and Tom Rowlands, Deptford, London, England, assignors to Molins Machine Company Limited, London, England, a British company Application May 31, 1955, Serial No. 514,342

Claims priority, application Great Britain June 3, 1954

8 Claims. (Cl. 271—57)

This invention concerns improvements in or relating to sheet detectors for printing, cutting, creasing and like machines.

The invention is particularly useful on a cutting and creasing machine of the kind described in United States Patent No. 2,737,238 where a sheet is fed beneath a forme and pressed against it by a rolling segment, because it is difficult to observe a sheet in such a machine and the consequences of two sheets being accidentally positioned beneath the forme may be serious.

According to the invention there is provided a detector device for printing, cutting, creasing and like machines comprising a sheet detector at the feeding side of the machine operated by a passing sheet, a sheet detector at the delivery side of the machine operated by a passing sheet, and a registering device to which each of the said detectors is operatively coupled; a sheet passing the first detector causing a recording impulse to be imparted to the registering device and a sheet passing the second detector causing a cancelling impulse to be imparted to the registering device. These impulses, which may be conveniently termed positive and negative, should succeed one another as long as the machine is working correctly but if a sheet entering the machine is not delivered properly, or a partly delivered sheet is dragged back into the machine, two like impulses will succeed one another.

It will be seen then that with this arrangement a sheet cannot be retained in the machine without the knowledge of the operator since the registering device may be arranged to operate a signalling device, or stop the machine, if the registration is not cancelled at the appropriate time. For instance it is possible in some machines, for instance, the one described in the specification referred to, for a sheet to be delivered, in the sense that it moves out of the machine far enough to cause the registration to be cancelled but it may be that a sheet, e. g. a torn sheet, will catch on the grill used for feeding and delivering sheets in said machine and be drawn back into the machine with the returning grill. In such a case the returning sheet will cause a second cancelling impulse to be imparted to the registering device and the final condition of the registering device explained in detail later may be used to cause a signal to be made or the machine to stop.

Further according to the invention there is provided a detector device for printing, cutting, creasing and like machines comprising means for registering an impulse each time a sheet is fed into the machine in the normal way and means for registering an impulse each time a sheet is delivered from the machine in the normal way, said means comprising a member movable in one direction by the first said impulse and in the opposite direction by the second said impulse and whose instant position indicates the presence or absence of a sheet in the machine. Thus during normal operation, said member has a limited movement each side of a mean position but if for any reason it receives two similar consecutive impulses it is displaced from said position by an abnormal amount and such abnormal movement may be used to operate, for example, a switch to stop the machine.

There are several possible events which may cause such abnormal movement of the member.

A sheet may be fed into the machine and not come out, because it adheres to the forme or is caught in some such way.

A sheet may come out of the machine but get caught on the grill, for example, because it is torn, distorted or crumpled, and be carried back into the machine by the returning grill.

It is important that detection should take place quite irrespective of whether the sheet is properly positioned in the machine at any time during the operation of the machine and for this reason detection is effected on sheets as they move into and out of the working position.

Further according to the invention there is provided a detector device for printing, cutting, creasing and like machines, comprising a detector at the feeding side of the machine, and a detector at the delivery side of the machine, said detectors operating in response to sheets passing them, and means coupled to said detectors adapted to displace a member in one direction on operation of the feeding detector and in the opposite direction on operation of the delivery detector, the member movements being substantially equal and normally cancelling one another as sheets are fed and delivered, abnormal movements of the member due to two similar displacements being adapted to operate a switch to stop the machine.

In a convenient construction the displaceable member is the planet arm of a differential gear whose sun wheels are moved respectively by the feeding detector and the delivery detector.

The invention will be described by way of example with reference to the accompanying drawings in which:

Figure 1 is a diagram of a cutting and creasing machine of the kind described in United States Patent No. 2,737,238 showing the application of the invention thereto;

Figure 2 is a sectional view taken on the line 2—2 of Figure 3, showing details of a detecting device at the right-hand side of Figure 1, and drawn to a larger scale;

Figure 3 is a section of Figure 2 on the line 3—3 but with the planet wheels of a differential gear displaced from their true position for better showing;

Figure 4 is a view looking at the underneath of Figure 2 and showing parts at the back of that figure;

Figure 5 is a front elevation of Figure 4;

Figure 6 is a detail of a pawl and ratchet wheel appertaining to Figure 2 but not visible in that figure;

Figure 7 is a view of a detecting device at the left-hand side of Figure 1, drawn to a larger scale;

Figure 8 is a view in the direction of the arrow A Figure 7 showing the connection between the detector and other mechanism;

Figure 10:
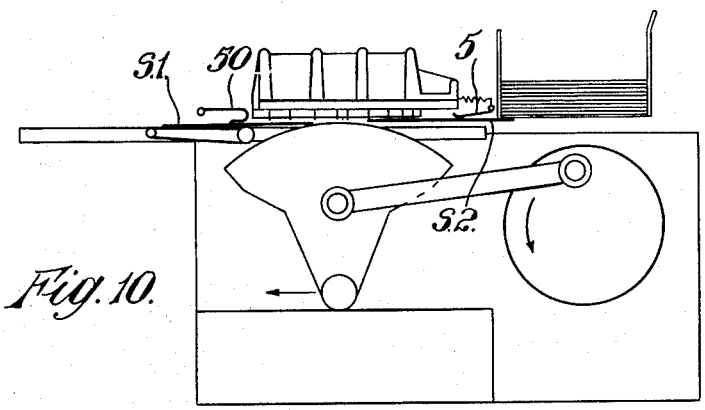
Figure 10 is a diagram illustrating detector operation.
Figures 11, 13:
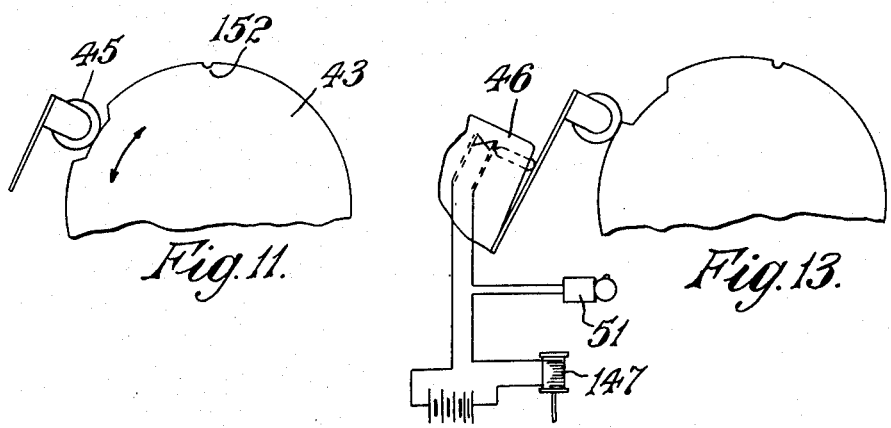
Figure 11 is a corresponding diagram of a displaceable member.
Figure 12:
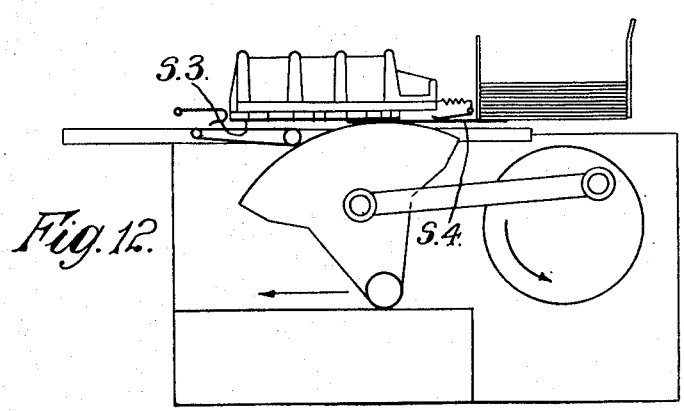

Figures 12 and 13; 14 and 15; 16 and 17 are views similar to Figures 10 and 11 with the parts in different positions.

Referring first to Figure 1, the machine has a forme 1 and a rolling segment 2 and grill 3, these parts and their functions being fully described and illustrated in the specification referred to. At 4 there is a magazine from which sheets are fed to the machine by any suitable sheet feeding device.

A feeler or detector is shown at 5. Each time a sheet passes beneath the feeler an impulse is registered, as will be described fully hereafter.

At the left-hand side of the machine there is a further feeler or detector 50 which causes an impulse each time a sheet passes out of the machine.

It will be apparent that a sheet accidentally drawn back into the machine will also operate the feeler 50 and cause an impulse. For simplicity therefore, an impulse meaning that a sheet has been fed into the machine in the normal manner will be termed a positive impulse while one meaning that a sheet has come out of the machine will be termed a negative impulse. As a sheet accidentally drawn back into the machine will operate the detector 50 such a sheet also causes a negative impulse. By arranging a device such as a member movable in response to an impulse to respond to the impulses a registering device is provided. That is, the instant position of the member depends on the last impulse it has responded to. By arranging the device in such manner that a negative impulse cancels a positive one and vice versa said device can be made to indicate the precise state of affairs at any instant. In the construction about to be described a positive impulse shifts the planet arm of a differential gear in one direction while a negative impulse shifts it in the opposite direction. In this example the planet arm is the registering device.

Normally one kind of impulse should be followed by the other kind and if something has gone wrong in sheet feeding, or removal, the planet arm will be shifted twice in the same direction. This excessive movement can be utilised to operate a switch to stop the machine and to operate an alarm device such as a bell 51, see Figure 13. The switch may be arranged to operate the solenoid 147 shown in Figure 1 of the patent referred to, and repeated in Figure 13, and cause the mechanical brake to be applied.

Referring now to Figures 2 to 5, the detector 5 is fixed to an arm 6 pivoted at 7. To the free end of the arm 6 is attached a spring loaded pawl 8 which is adapted to engage a ratchet wheel 9. A spring 10, Figure 1, pulls the detector 5 down and when it is raised by a sheet being fed into the machine in the usual way, that is, in the direction of the arrow, the resulting movement of the arm 6 is caused to turn the ratchet wheel 9 through a certain angle. A stop pin 11, Figure 2, limits the upward movement of the pawl 8.

As seen in Figure 3 the ratchet wheel 9 is fixed to a sun wheel 12 of a differential gear which is provided with planets 13 carried on an arm 14 constituted as follows: Each planet wheel is rotatable on a pin 14A fixed in a rectangular block 43A integral with a plate cam 43 described in detail later. The block 43A is rotatable on the support shaft 100 of the differential gear. It will be seen from Figure 2 that the plate cam is slotted at opposite ends of the diameter and these slots provide clearance for the planet wheels to rotate. In Figure 3 the block 43A and planet wheels have been swung round 90° from the position shown in Figure 2 so that the mounting of the planet wheels can be more easily seen. From the foregoing it will be understood that the arm 14 which carries the planet wheels is a built-up construction formed by the parts 43A and 14A. Thus rotation of the ratchet wheel moves the sun wheel 12 and this causes the planets to roll on another sun wheel 42, and the planet arm 14 shifts accordingly. Since a sheet is being fed normally into the machine the planet arm 14 has had a positive impulse given to it, or in other words a positive impulse has been registered.

Referring now to Figures 6 to 9 the detector 50 is fixed to a shaft 15 pivoted at 16 in brackets 17 and 18. It will be noticed that the bracket 17 extends much further from the cross-head 19 than does bracket 18 but this is only because the end of the crosshead 19 is of irregular formation.

Figure 9:
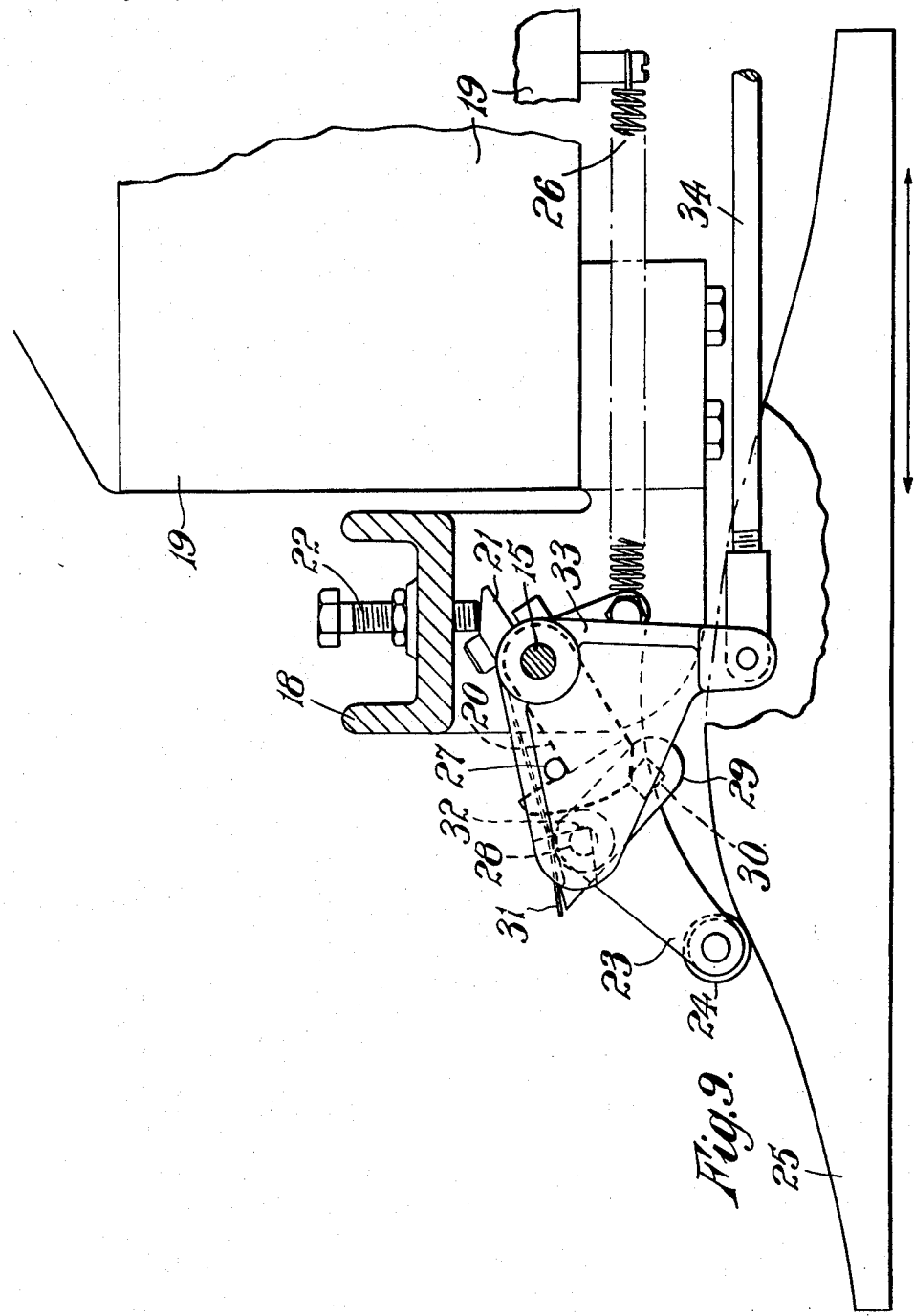
Figure 9 is a section on the line 9—9 Figure 8.

A sheet passing out of the machine contacts with the detector 50 and causes a negative impulse to be registered, all in the following manner:

On shaft 15 there is fixed a lever 20 whose hidden outline is shown in thick short dashes in Figure 9. An abutment 21 on one end of the lever is checked by an adjustable stop 22.

On shaft 15 there is loosely pivoted a cam lever 23 whose hidden outline is shown in thin short dashes. A follower 24 on the free end of this lever is engaged by a cam 25 fixed to the grill 3 of Figure 1 and so the lever is oscillated by the cam and a spring 26 while the grill moves to and fro. There is a pin 27 fixed to the cam lever 23 and at 28 there is pivoted on the lever a pawl 29 having at its lower free end a projection 30 in the shape of a square pin, bevelled off at one corner. The pawl is pressed by a flat spring 31 so that the bevel of the square projection is forced against the side of lever 20 and the other side of the lever is held by the pin 27. Thus the cam lever 23 is temporarily locked to the lever 20 and the detector 50 will in consequence be swung up and down as the cam 25 goes by. If a sheet is beneath the detector 50 at the proper time the downward movement of the detector will be checked. The pawl 29 will therefore rotate on its pivot 28 stressing the spring 31 and the projection 30 can then swing round the curved end of the lever 20 and eventually the projection 30 will engage an abutment 32 formed on a bell crank lever 33 which is pivoted freely on the shaft 15. The lower corner of the bell crank lever 33 has a pull rod 34 pivoted thereto and so when a sheet passes out of the machine the rod is pulled. The other end of the rod 34 is shown on Figure 5 where it is pivoted at 35 to a double-armed lever 36 pivoted at 37 on a pin 38, see also Figure 2, which pin is the rocking pivot of a pawl lever 39, see Figure 6, similar in shape to the pawl lever 6 of Figure 2, and has a pawl 40 adapted to engage a ratchet wheel 41 fixed to the sun gear 42. Thus as the lever 36 rocks it is caused in a manner explained later to swing the pivot 38 and a negative impulse is transmitted to the planet arm 14, cancelling the positive impulse imparted thereto by the same sheet when fed into the machine.

This is the normal state of affairs when the machine is operating correctly.

If however there is no sheet present when the detector 50 moves down, the cam lever 23 and the lever 20 will move, locked together. The radius on which the square projection 30 swings is such that it will swing just clear of the abutment 32 so the bell crank lever 33 and pull rod 34 will remain still. In the action under discussion this means that a sheet fed into the machine has not come out again so it is imperative to stop the machine before the complete feeding of a further sheet. Because no negative impulse has been made, the planet arm 14 is still at the position due to a positive impulse. The passage of the next sheet under the detector 5 will cause another positive impulse to be registered, i. e. the planet arm moves again and has now moved through twice the arc due to a single impulse. From the block 43A of the planet arm there extends a plate cam 43, see Figures 2 and 3, and this cam, due to the two successive positive impulses, is brought to the position shown in Figure 2. It will be seen that a depression 44 in the cam has just passed a roller 45 and this roller is thereby caused to operate a micro switch 46 and cause the machine to stop, e. g. it is dynamically braked by any known system or the catch or the aforesaid mechanical brake is tripped. In this way the feeding of a sheet while one is still under the cross head is caused to stop the machine before it is damaged.

In practice, the speed and arrangement of the machine are such that a sheet passing into the machine moves the planet arm for a positive impulse but the arm is almost instantly moved the other way for a negative impulse and then, before the arm can get back to its original position it is moved again for a positive impulse.

It may happen that a sheet passes out of the machine in the normal way, giving the appropriate negative impulse but is accidentally caught in the grill and dragged back. It is necessary that such a sheet, which is "in" the machine should register another negative impulse to prevent the feeding of a further sheet into the machine, that is, beneath the former until the first said sheet is clear. Now the sheet has already made a negative impulse in passing out and the planet arm is moving back to the position where it is ready to receive a further positive impulse on the feeding of the next sheet into the machine. It gets this positive impulse at the beginning of the feeding of the next sheet, which is taking place at about the same time as the delivery of the first sheet, that is, the positive impulse occurs immediately after the negative. As the first said sheet (i. e. the one caught in the grill) is dragged back (which does no harm as there is room beneath the forme) it again causes a negative impulse and the arm and cam are moved so that the roller 45 then touches the upper end of the depression in the cam. On the next forward stroke of the grill (but before the new sheet enters into the machine sufficiently to cause a positive impulse) the detector 50 feels that there is a sheet, or two sheets, or a crumpled mass, on the delivery grill and the resulting negative impulse will move the arm again in the negative direction so the roller 45 rides up on top of the cam and the machine stops.

The above movements may be better understood by reference to Figures 10 to 17.

When the machine is empty the upper end of the depression 44 in the plate cam 43, which is, as previously explained, fixed to the planet arm, is touching the roller 45. The position then is the same as that shown in Figure 15. A positive or recording impulse will shift the cam 43 clockwise, as seen in these figures, and the roller 45 will then be touching the lower end of the depression. But in normal or continuous operation a sheet will go out as the next is being fed in so that the positive impulse will succeed the negative or cancelling impulse almost instantly and the cam 43 will therefore move back anticlockwise due to an impulse from the detector 50 but before the cam reaches the position where the roller is again touching the upper end of the depression it will be moved back clockwise as the next sheet is fed in. Thus the cam oscillates about the mean position during normal working and is shown midway of the depression in Figure 11; Figure 10 showing the machine feeding one sheet S.2, while delivering the preceding sheet, S.1.

Suppose a sheet S.3, Figure 12, remains under the cross-head because, for example, the ejectors of the forme have failed to dislodge it. The feeding of this sheet has already caused a positive impulse and the next fed sheet S.4 will give rise to another positive or recording impulse. But there has been no intervening negative or cancelling impulse because S.3 has stuck in the machine. The two consecutive positive impulses will have shifted the cam two stages clockwise and the roller 45 will now be on top of the cam as shown in Figure 13.

Figure 14:
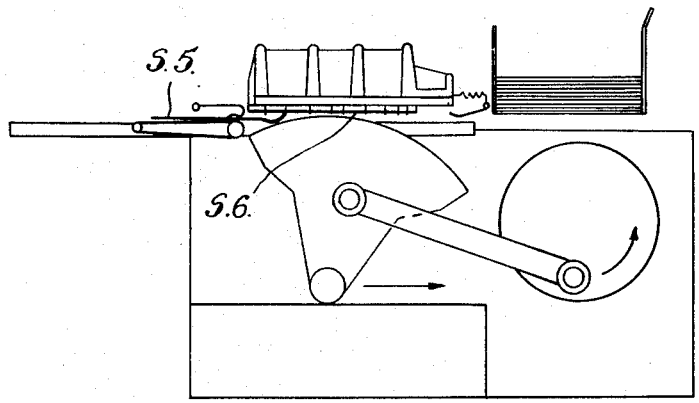
Figure 15:
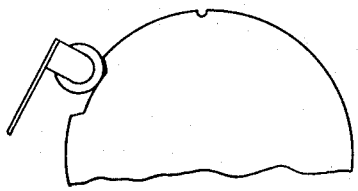
Figure 17:
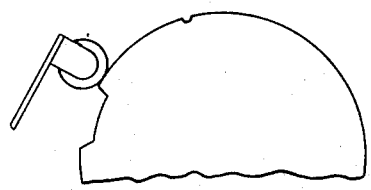
Figure 16:
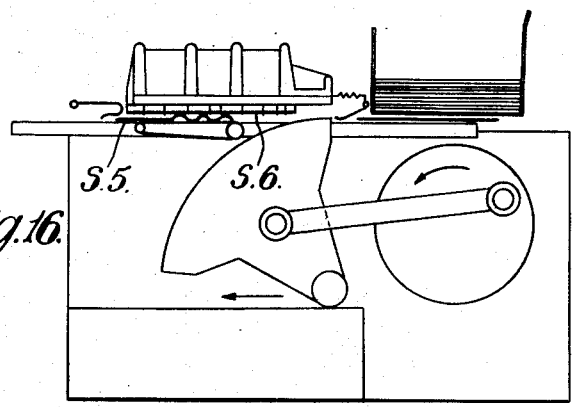

Alternatively, suppose an outgoing sheet S.5, Figure 14, catches in the grill and is being drawn back while the succeeding sheet S.6 is under the forme being creased as in Figure 14. The caught sheet S.5 has made a normal negative impulse on its outgoing movement, succeeded immediately by a positive impulse due to S.6 feeding. But S.5 makes a further negative impulse as it is dragged back so the cam is now in the position shown in Figure 15. As the grill goes outwards again following the movement initiated in Figure 16, the caught sheet S.5 will cause another negative impulse so the cam 15 moves another stage anticlockwise bringing it to the position shown in Figure 17.

Thus if a sheet does not go out of the machine, or is dragged in again the cam is so moved that the roller has to ride up to the maximum radius. This operates the microswitch and the machine is stopped at once.

As the movements above described are responsive to the passage of sheets, the output of the machine may be counted by a ratchet driven counter of the usual kind. For this purpose a counter 47 is fitted on top of the casing enclosing the parts shown in Figure 2, and its operating lever 48 Figure 5 is connected by a link 49 to the double armed lever 36. It so happens that the operating arc of the counter exceeds the swing of the pawl lever 39 and in order to compensate for this the lever 36 is, as aforesaid, pivoted on the pin 38 and is coupled through a spring 51 to a lever 52 fixed to the pivot 38. In this way the initial movement of the lever 38 operates the pawl arm and turns the ratchet wheel 41 and when the arm 39 is arrested by its stop pin 53 the spring 51 stretches, while the lever 36 still moves to register a count through the link 49.

In order to prevent overrunning of the ratchet wheels and consequent abnormal displacement of the cam 43 a brake 54 is fitted to the hub of each ratchet wheel.

The cam 43 projects through a hole in the casing and the parts can thus be reset when the machine has been automatically stopped as above described. The cam is marked with a Zero line, a nick 152 (Figure 11), and this must be set at the commencement of a run against a line on the casing marked "No sheet in." If the machine has been stopped by the micro switch the Zero line must be set, before restarting against "No sheet in" if conditions are such that the machine is empty. If, however, a sheet is under the forme and ready to be delivered in the normal way the Zero line must be set against a further line on the cover marked "One sheet in." The distance between the two lines on the cover is the distance the cam moves for one impulse to the planet arm.

It will be noted that when a sheet is dragged back there will be a false count. This is not of importance since counting is only to give a day's output, which runs to many thousands of sheets, and dragging back is an unusual occurrence. Detecting and tripping are generally due to the succession of two positive impulses, because the machine has failed to deliver a sheet.

In the drawings certain parts are marked P and N corresponding to the positive and negative impulses above referred to.

What we claim as our invention and desire to secure by Letters Patent is:

1. A detector device for printing, cutting, creasing and like machines comprising a sheet detector at the feeding side of the machine operated by a passing sheet, a sheet detector at the delivery side of the machine operated by a passing sheet, and a registering device to which each of the said detectors is operatively coupled; a sheet passing the first detector causing a recording impulse to be imparted to the registering device and a sheet passing the second detector causing a cancelling impulse to be imparted to the registering device.

2. A detector device as claimed in claim 1 comprising an electric switch and means associated with the registering device operable to close the switch whereby a stopping device for the machine is operated when owing to two successive operations of one of said detectors without an intervening operation of the other of said detectors two like impulses are given consecutively to the registering device by detector operation.

3. A detector device as claimed in claim 1 and for use with a cutting and creasing machine having a reciprocating grill wherein the detector at the delivery side of the machine is mechanically operated to move towards the grill for sheet detection when the sheet supporting part of the grill is moving past the detector position.

4. A detector device for printing, cutting, creasing and like machines comprising means for registering an impulse each time a sheet is fed into the machine in the normal way, means for registering an impulse each time a sheet is delivered from the machine in the normal way, and a member movable in one direction by the first said impulse and in the opposite direction by the second said impulse.

5. A detector device as claimed in claim 4, comprising an electric switch operatively connected to said member which moves to close the electric switch whereby a stopping device for the machine is operated when owing to two successive operations of one of said detectors without an intervening operation of the other of said detectors the member is moved twice in succession in the same direction.

6. A detector device as claimed in claim 4 wherein said member is one planet arm of a differential gear, the detector being coupled to one sunwheel of the gear by a pawl movable by said detector and driving a ratchet wheel attached to the respective sunwheel and the other detector being coupled to the other sunwheel by a pawl movable by said detector and driving a ratchet wheel attached to said other sunwheel.

7. A detector device as claimed in claim 6 wherein the member has a cam fixed thereto provided with a cam follower connected to an electric switch so that a suitable movement of the cam closes the switch whereby a stopping device for the machine is operated when owing to two successive operations of one of said detectors without an intervening operation of the other of said detectors the member is moved twice in succession in the same direction.

8. A detector device for printing, cutting, creasing and like machines, comprising a detector at the feeding side of the machine, and a detector at the delivery side of the machine, said detectors operating in response to sheets passing them, and means coupled to said detectors adapted to displace a member constituting a registering device movable in one direction on operation of the feeding detector and in the opposite direction on operation of the delivery detector, the member movements being substantially equal and normally cancelling one another as sheets are fed and delivered, abnormal movements of the member due to two successive operations of one of said detectors without an intervening operation of the other of said detectors causing two similar displacements of said one detector, being adapted to operate a switch to stop the machine.

No references cited.